United States Patent [19]

Takao

[11] Patent Number: 4,779,092
[45] Date of Patent: Oct. 18, 1988

[54] METHOD AND APPARATUS FOR EFFECTING MULTI-STATION DATA TRANSMISSION HAVING A VARIABLE NEXT STATION ADDRESS

[75] Inventor: Mitsuji Takao, Tokyo, Japan

[73] Assignee: Canon Kabushiki Kaisha, Tokyo, Japan

[21] Appl. No.: 120,178

[22] Filed: Nov. 13, 1987

Related U.S. Application Data

[63] Continuation of Ser. No. 521,831, Aug. 10, 1983, abandoned.

[30] Foreign Application Priority Data

| Aug. 19, 1982 | [JP] | Japan | 57-142627 |
| Sep. 1, 1982 | [JP] | Japan | 57-150732 |
| Sep. 20, 1982 | [JP] | Japan | 57-162330 |
| Oct. 1, 1982 | [JP] | Japan | 57-170915 |
| Oct. 1, 1982 | [JP] | Japan | 57-170916 |
| Oct. 1, 1982 | [JP] | Japan | 57-170917 |

[51] Int. Cl.⁴ .................................................. H04Q 1/00
[52] U.S. Cl. ......................... 340/825.52; 340/825.5; 340/825.51; 370/85
[58] Field of Search .............. 340/825.05, 825.07, 340/825.13, 825.5, 825.51, 825.52; 370/82, 85, 86, 88, 92

[56] References Cited

U.S. PATENT DOCUMENTS

| 4,058,681 | 11/1977 | Imaizumi et al. ..................... 370/85 |
| 4,287,592 | 9/1981 | Paulish et al. ........................ 370/92 |
| 4,410,889 | 10/1983 | Bryant et al. ......................... 370/82 |
| 4,423,414 | 12/1983 | Bryant et al. ................... 340/825.07 |
| 4,495,493 | 1/1985 | Segarra et al. ............. 340/825.05 X |
| 4,506,360 | 3/1985 | Kryskow, Jr. et al. .......... 370/86 X |

FOREIGN PATENT DOCUMENTS 0060067 9/1982 European Pat. Off. .............. 370/85

Primary Examiner—Ulysses Weldon
Attorney, Agent, or Firm—Fitzpatrick, Cella, Harper & Scinto

[57] ABSTRACT

A data communication method allows communication to only one of a plurality of stations in a network which possesses a communication right. The station which possesses the communication right searches an operable station in the network, yields the communication right to the selected operable station, stores an address of the selected operable station, and in subsequent yielding of the communication right, yields the communication right to the station having the stored address.

7 Claims, 16 Drawing Sheets

| FLAG | RECEIVING STATION ADDRESS | TRANSMITTING STATION ADDRESS | COMMAND CODE | TIMER VALUE | FCS | FLAG |

METHOD AND APPARATUS FOR EFFECTING MULTI-STATION DATA TRANSMISSION HAVING A VARIABLE NEXT STATION ADDRESS

This application is a continuation of application Ser. No. 521,831 filed Aug. 10, 1983, now abandoned.

BACKGROUND OF THE INVENTION

1. Field of the Invention

The present invention relates to a data communication method for transmitting and receiving data such as characters or images between distant stations, and more particularly, to a data communication method suitable for use as a local area network for transmitting and receiving data in a limited area.

2. Description of the Prior Art

As office automation has been recently progressed, a local area network (LAN) which links various office equipment such as image reading/recording apparatus and word processors through an inexpensive and simple network has been developed. In such an LAN, a number of stations are usually connected to a common communication transmission path, which is shared by the stations communicating with each other. Thus, if communications are initiated concurrently from two or more stations, a so-called "conflict of communication" may occur.

In order to avoid the conflict of communication or to countermeasure a conflict of communication, several network control systems which control the timing of the start of call by the stations in the network have been proposed.

However, none of these systems is a network control system which fully satisfies the utilization requirements of users.

In addition, the proposed network control systems are restricted by a network configuration and have little freedom for expansion of the network or for application to a different network configuration installation.

The local area network is derived from a computer network, but a configuration thereof has been significantly simplified and is different from that of the computer network in order to reduce the cost thereof.

In general, the office equipment connected to the local area network are of a variety of types and have different data output configurations. Accordingly, the waiting time of a station which requests a communication right during communication with another station is indefinite and communication efficiency is low.

When the local area network is expanded or modified, the network control system should be modified. It is very time consuming and ineffective from a cost standpoint to modify individual equipment to be connected to the network.

The communication network may be expanded by linking networks, but it is not advisable from a cost standpoint to introduce a new network control system to link the networks. It is desirable that the stations in the linked network can execute the same configuration of communication as that in the network to which they belong.

SUMMARY OF THE INVENTION

It is an object of the present invention to provide a data communication method suitable to transmit data such as images.

It is another object of the present invention to provide a data communication method which smoothly delegates a communication right between a plurality of stations of a network.

It is another object of the present invention to provide a data communication method which eliminates influencing and being influenced by stations not contributing to transmission of image data.

Another object of the present invention is to provide a data communication method which effectively utilizes a network of a relatively simple configuration.

It is another object of the present invention to provide a data communication method which can readily accommodate modification or expansion of a network.

Another object of the present invention is to provide a data communication method which does not require significant modification of a data format in linking a plurality of networks.

The above and other objects and advantages of the present invention will be apparent from the following description of the invention.

DETAILED DESCRIPTION OF THE PREFERRED EMBODIMENTS

As described above, as office automation has been progressed, the local area network (LAN) which connects various office equipment through an inexpensive and simple network transmission line has been developed. In such a type of LAN, a number of stations are usually connected to a common communication transmission line, which is shared by the stations to communicate among the stations. Thus, when communications are initiated concurrently from two or more stations, a conflict of communication may occur.

In order to avoid a conflict of communication, several network control systems for controlling the timings of start of call by the stations in the network have been proposed. Of those, a token passing system is known as one of the best methods. In the token passing system, a communication right which allows one of the stations to exclusively use the network transmission line is logically set and only one of the stations in the network can possess the communication right. When the station which possesses the communication right terminates the communication or it does not communicate, the communication right is yielded to other station.

In a widely adopted token passing system, a go-ahead method in which a station terminated the communication successively yields the communication right to the downstream adjacent stations in order to give an even chance of communication to every station in the network, and the communication right is circulated in the network transmission line in a predetermined direction. The communication in the network is proceeded in accordance with a predetermined protocol. Thus, each station is provided with a processor which effects the communication control by a predetermined firmware.

Figure 1:
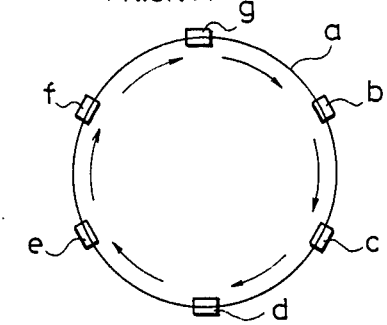
FIG. 1 shows a configuration of a prior art local area network.

The network control configuration by the token passing system is adapted to be applied to a ring network which uses a transmission line such as an optical fiber because the go-ahead type communication right circulation system is well suited to a physical configuration of the ring network. For example, as shown in FIG. 1, a flow of signal in a transmission line a in the ring network is usually unidirectional. Thus, gate circuits for interrupting the signal on the transmission line are provided and the gate is opened or closed to sequentially yield the communication right to the downstream adjacent stations b-g. In this manner, the go-ahead type communication right circulation system is easily attained.

However, such a ring network has just recently been provided and many local area networks use bus networks such as coaxial lines or twisted cables. The bus network has a configuration in which the transmission line extends linearly and it is frequently used in a different network control system than the token passing system. A main reason therefor is that the linear network is very unsuitable to circulate the communication command data such as the communication right yielding command and hence the network control configuration of the token passing system is not readily applied as it is in the ring network. However, the bus network having its opposite ends open is more advantageous than the closed ring network in extending the network distance to expand the system. Furthermore bus networks are possessed by many users as assets because of the length of time they have been available.

In addition, the coaxial lines and the twisted lines have been used as transmission lines for quite some time and they are relatively inexpensive. Taking those advantages of the bus network into consideration, it is necessary to provide a network control system which enables the token passing system to be applicable to the ring network as well as to the bus network. The demand for such a control system is high.

In the light of the above, a token passing type network control system which can control both the bus network and the ring network and is effective to a change of system configuration is now explained.

Figure 2:
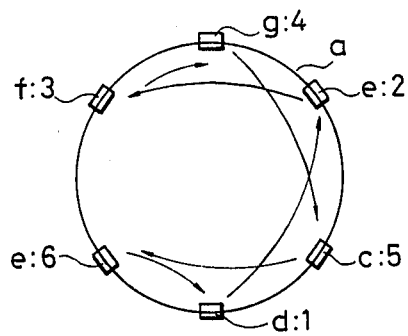
FIG. 2 shows a configuration of a local area network in accordance with the present invention.

FIG. 2 shows a configuration of a local area network having the functions described above, in which a designates a ring network transmission line, and b-g denote transmitting/receiving stations connected to the transmission line a. Addresses (station numbers) of the stations b-g are arbitrarily assigned independently of the connection positions of the station as shown in Table 1.

TABLE 1

| Station | b | c | d | e | f | g |
|---|---|---|---|---|---|---|
| Address | 2 | 5 | 1 | 6 | 3 | 4 |

In yielding the communication right, one of the stations b-g which possesses the communication right yield the communication right to the station which is closest thereto and has a larger address. Thus, as shown by arrows in FIG. 3, the communication right is sequentially yielded in the sequence of address and circulated in the transmission line a. As shown by arrows in FIG. 2, the communication right is yielded in the sequence of d→b→f→g→c→e→d . . . Thus, as compared with the prior art communication right yielding configuration in which the communication right is yielded to the downstream adjacent station, the configuration of FIG. 2 appears to be disordered at a first glance, but a trace of the station addresses to which the communication right is yielded is a complete go-ahead type yielding configuration linked in the sequence of the addresses 1-6 as shown in FIG. 3.

Figure 4:
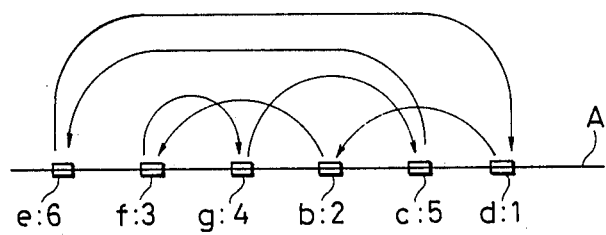

FIG. 4 shows an embodiment in which the above communication right yielding configuration is applied to a bus network, in which A designates a bus network transmission line. Relations between the transmitting/receiving stations b-g connected to the transmission line A and the addresses 1-6, and the communication right yielding system are same as those in the ring network embodiment of FIG. 2.

Figure 3:
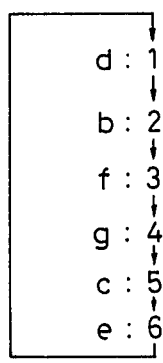
FIG. 3 illustrates a sequence of yielding of a communication right in FIG. 2, FIGS. 4 to 6 show other configurations of the local area network of the present invention.

As a result, as shown by arrows in FIG. 4, the sequence of yielding the communication right is in the sequence of the addresses of the stations b-g like in FIG. 3 and the go-ahead type network control configuration is attained as is done in the ring network of FIG. 2. In the system in which the communication right is yielded to the physically adjacent downstream station to circulate the communication right, the closed loop transmission line is required. On the other hand, in the present system, since the communication right is yielded in the sequence of the addresses of the stations, it is not affected by the physical configuration of the transmission line of the network and it is equally applicable to the bus transmission line A and the ring transmission line a.

Figure 5:
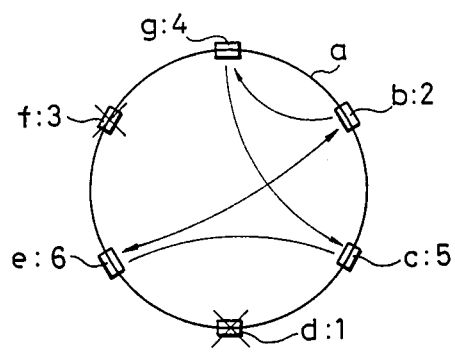
Figure 6:
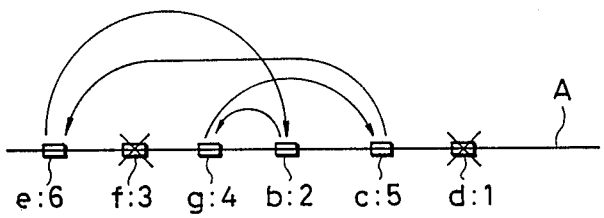
Figure 7:
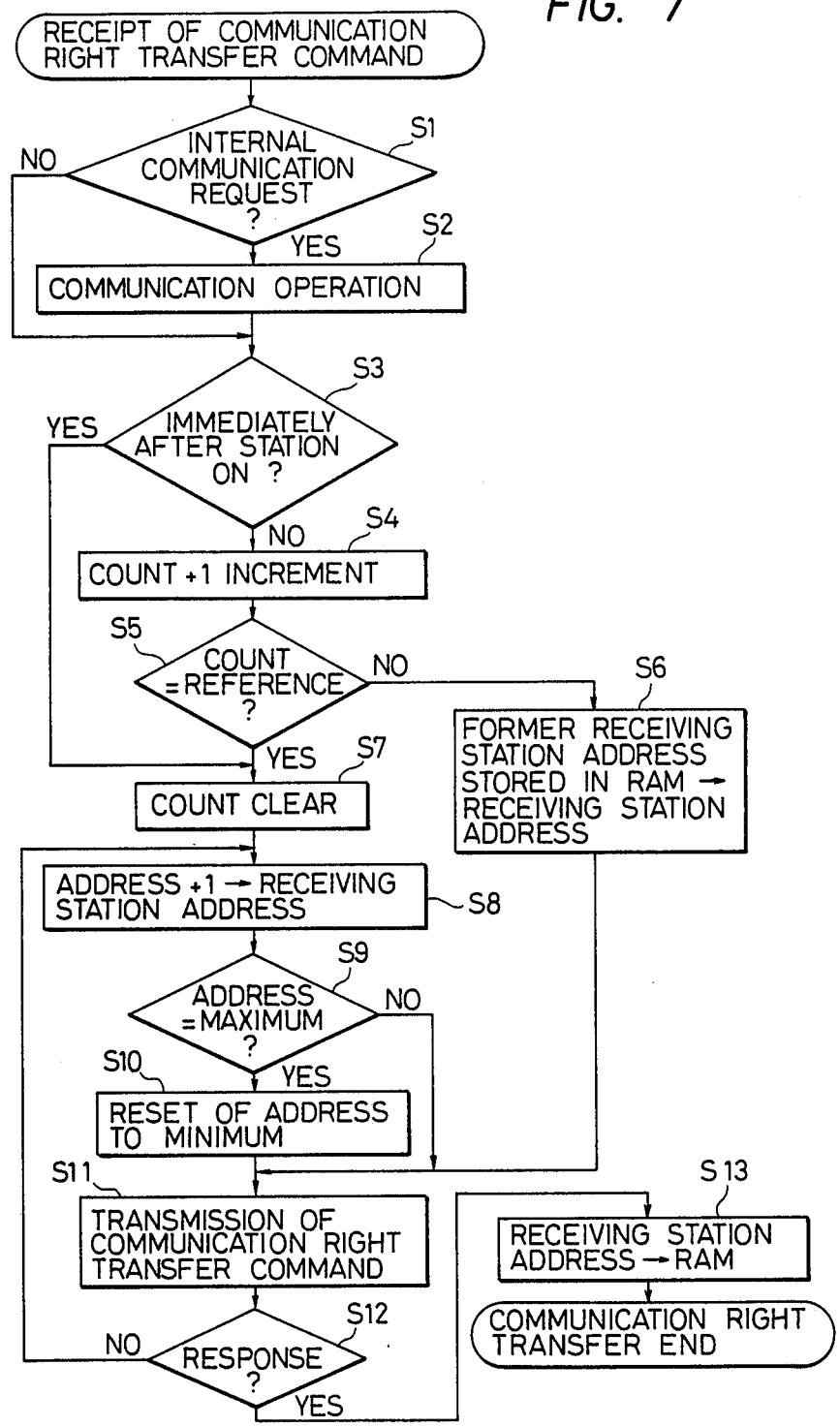
FIG. 7 shows a flow chart for a control operation in FIGS. 5 and 6.

In the control operations of the first and second embodiments shown in FIGS. 2 and 4, it was assumed that all of the stations b-g in the network are operable. In actuality, however, it frequently occurs that some stations are powered off during the operation of the network or inoperable due to some trouble or other reasons and the addresses of the effective stations are not continuous but discontinuous. Accordingly, it is necessary to select only the operable stations in the network and attain the go-ahead type communication right circulation operation in the sequence of address. FIGS. 5 and 6 show embodiments which meet the above requirement. The control operations thereof are now explained with reference to a flow chart of FIG. 7.

In the networks of FIGS. 5 and 6, it is assumed that the stations d and f marked with X are inoperable and the networks are equipped with the following communication control protocol.

(T1) Communication data transmitted among the stations b-g through the transmission line a or A has communication control commands in a data field, one of which commands is a communication right yield command. The communication right yield command data contains an address code (address number) of the station which is to receive the command. When the communication right yield command is sent from the station, only the station having the address corresponding to the station address in the command receives the command.

(T2) When the receiving station receives the communication right yield command (step S1), a reply communication data indicating the reception of the command is sent back from the receiving station to the command sending station (step S2).

(T3) In order to assure the yielding and the circulation of the communication right, the stations b-g have communication control means for performing the following processings. Those means are attained by the communication control firmware in the respective stations. The station which received the communication right yield command terminates its communication processing, or if it is not processing the communication, issues a communication right yield command to the other station. However, each of the stations does not contain the station address to which the communication right is to be next yielded, immediately after the start-up of the network system, for example, immediately after the power-on (step S3). The station address designates the operable station which is closest to the station possessing the communication right and has a larger address. Thus, the station which yields the communication right sequentially carries out the following trials and decisions.

(t-1) If it is immediately after the start-up of the station, the station jumps from the step S3 to a step S7 to clear a count and increments its station address by one to create a receiving station address (step S8), and sends the communication right yield command together with the receiving station address (step S11). If a response indicating the reception of the command (reply communication data) is not received within a predetermined time period (step S12), the station regards the station having the receiving station address as not being in the network or that it is inoperable by power-off or other reason and returns to the step S8 where it again increments the receiving station address by one. The above steps are repeated until the response is received.

(t-2) If the reply indicating the reception of the command is not received after the receiving station address has reached a predetermined maximum station address in the network (step S9), it sets the receiving station address to a predetermined minimum station address in the network (step S10) and sends the communication right yield command (step S11).

(t-3) If two or more operable stations including the communication right yielding station exist in the network, a response indicating the reception of the command must be received for the command sent in the step S11 in a procedures (t-1) and (t-2). If the response is received (step S12), the communication right yielding operation is terminated and the receiving station address is stored in a memory (RAM) of the station to which the communication right was yielded (step S13). In order to save the procedures (t-1) and (t-2) to improve the communication efficiency, the stored receiving station address is used in a subsequent communication right yielding operation (step S6).

(t-4) However, in case the station is rendered inoperative by power-off or other reason during the operation of the network or an operable station is newly joined to the communication network, after a predetermined member of times of performing the communication right yielding operation (steps S4 and S5), the stored receiving station address is no longer used and the steps S7-S12 of the procedures (t-1) and (t-2) are repeated to update the stored station address to which the communication right is to be yielded (step S13).

(t-5) If a response indicating the reception of the command is not received (step S12) after the communication right yielding command has been sent together with the receiving station address which was determined in the step S12 of the procedure (t-3) and stored in the RAM (steps S6 and S11), the station regards that the station to which the communication right is to be yielded is inoperable and returns to the step S8 in the procedures (t-1) and (t-2) to determine a station to which the communication right is to be yielded.

Figure 8:
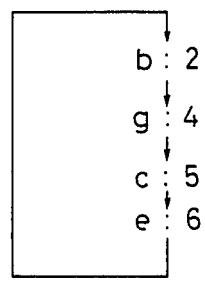
FIG. 8 illustrates a sequence of yielding of a communication right in FIGS. 5 and 6.

Through the above communication control processing, the communication right yielding operation is attained even when inoperable stations exist as shown in the third and fourth embodiments shown in FIGS. 5 and 6, in which the arrows show the stations to which the communication rights are to be yielded and FIG. 8 shows a trace of the station addresses to which the communication right is yielded.

Figure 9:
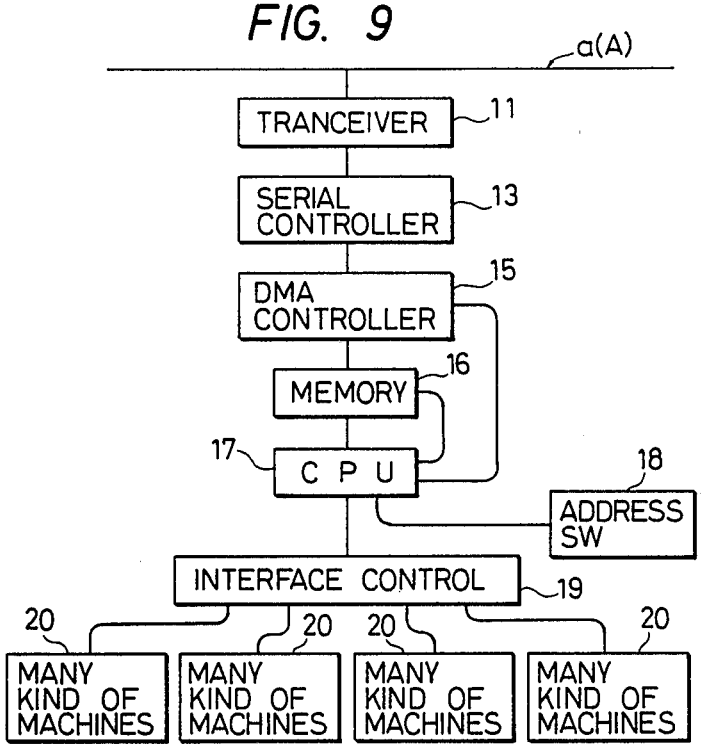
FIG. 9 shows a block diagram of a station in FIG. 2 and FIGS. 4–6.
Figure 10:
FIG. 10 illustrates a communication data format used in the networks of FIG. 2 and FIGS. 4–6.

FIG. 9 shows a configuration of the station shown in FIGS. 2 and 4-6. Numeral 11 denotes a transceiver for transmitting to and receiving from the network transmission line a (or A), and numeral 13 denotes a serial controller which is coupled to the transceiver 11 and designed to comply with a type of the data transmission in the transmission line a (or A) and functions as an interface to the transmission line a (or A). Communication data on the transmission line a (or A) as shown in FIG. 10 is transferred from the transceiver 11 to a DMA controller 15 through the serial controller 13 and then stored in a memory 16. A central processing unit (CPU) 17 analyzes the network address in the received communication data in accordance with a program as shown by the flow chart of FIG. 7 which is stored in a ROM of the CPU 17 to carry out the communication right yielding operation.

Numeral 18 denotes an address switch connected to the CPU 17, which is used to set the address in the network. Numeral 19 denotes an interface control connected to the CPU 17, which controls inputs/outputs of various office equipment 20.

FIG. 10 shows a format of the communication data used in the networks of FIGS. 2 and 4-6. Numeral 31 denotes a receiving station address field, numeral 32 denotes a transmitting station address field, numeral 33 denotes a type of data field and numeral 34 denotes a data field.

As described above, since the station to which the communication right is to be yielded is determined not by the sequence of physical arrangement of the stations in the network but by the station addresses, both the ring network and the bus network can be controlled.

Further, since the station address to which the communication right is to be yielded is automatically updated depending on the reconfiguration of the network, the present method is readily adaptable to the modification or expansion of system and inoperable stations due to some trouble in the system, and can improve freedom of operation.

Further, since the present method can be readily attained by conventional communication control firmware, it is very inexpensive.

As described above, when the communication right is yielded either in physical sequence or by the station addresses, only one station in the network sends the command at a time and hence conflict of communication does not occur.

However, according to the above method, multiple communication cannot be attained even when a transmitting station has a vacant time slot during the communication operation. Since the number of stations connected to the local area network transmission line frequently varies depending on the system configuration of a user, once a station gives up the communication right, there is no assurance of time in which the communication right is again returned to the original station after the circulation through all other stations. Accordingly, once the station gets the communication right, it cannot yield the communication right to another station until it completes all necessary communication processing operations. However, it frequently occurs that office equipment belonging to the station which possesses the communication right temporarily pauses the communication processing operations in order to record or print an image in accordance with a received image information. Even in such a case, the communication right is not yielded to the downstream station and the communication operation in the whole network is temporarily stopped. As a result, the communication efficiency is remarkably lowered.

A network control system in which, if a vacant time slot occurs such as by the recording of the image in the station possessing the communication right, the communication right is temporarily yielded to another station but the original station can restore the communication right without waiting for the circulation of the communication right through the network so that multiple communication operation can be attained, is now explained.

Figure 11:
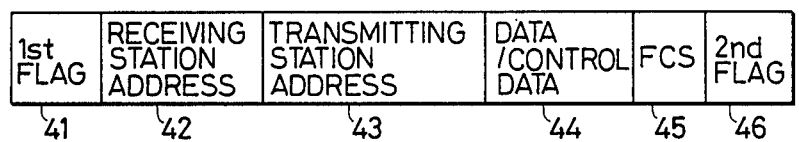
FIG. 11 illustrates a communication data format used in the present invention.

FIG. 11 shows a format of a communication data used in such a network control system. Like in a HDLC (high level data link control procedure) communication, numeral 41 denotes a first flag field which indicates a start of (transmitted) data, numeral 42 denotes a receiving station address field to which an address of a destination station or a downstream station is written, numeral 43 denotes a transmitting station address field to which an address of a source station is written, numeral 44 denotes a data/control data field to which a (transmitted) data or a control data is written, numeral 45 denotes a FCS field for checking a validity of a received data, and numeral 46 denotes a second flag field which indicates the end of the transmitted data.

The complete yielding of the communication right to other station is effected by the control communication data shown in FIG. 11. This communication data is hereinafter referred to as a token command. When a station receives the token command, it can send the communication data by itself. The other stations are allowed to only receive the communication data and send a response data therefor.

The communication right yielding operation of the present system can be effected in either the station address system shown in FIGS. 2 and 4 or the token passing system which uses the physical connection sequence.

The receiving station which received the temporary communication right yield command receives an acknowledge signal (ACK) or a non-acknowledge signal (NACK) from the source station after the predetermined data transmission, and the ACK or NACK signal is written in the control data field 44.

Figure 12:
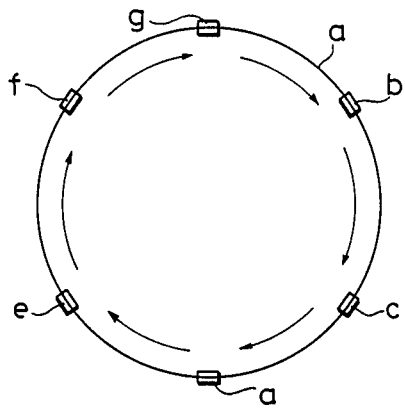
FIGS. 12 and 13 show communication data flowing in a communication mode in accordance with the present invention, FIG. 14 composed of FIGS. 14A and 14B illustrates a control operation of a station in FIGS. 12 and 13.
Figure 13:
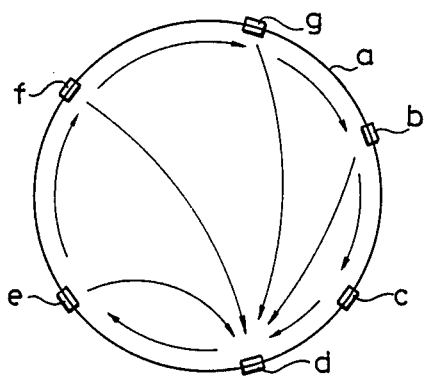
Figure 14A:
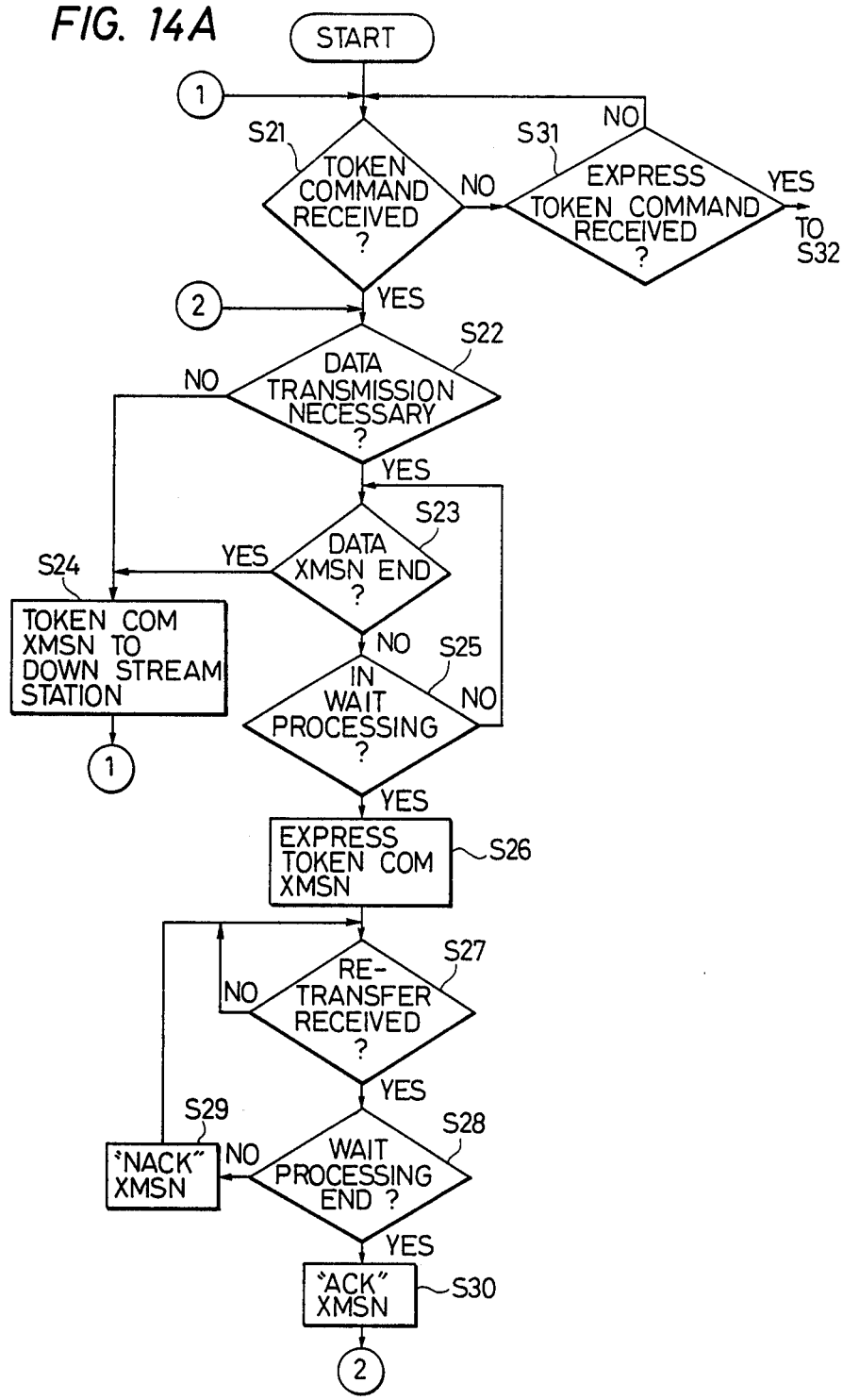
Figure 14B:
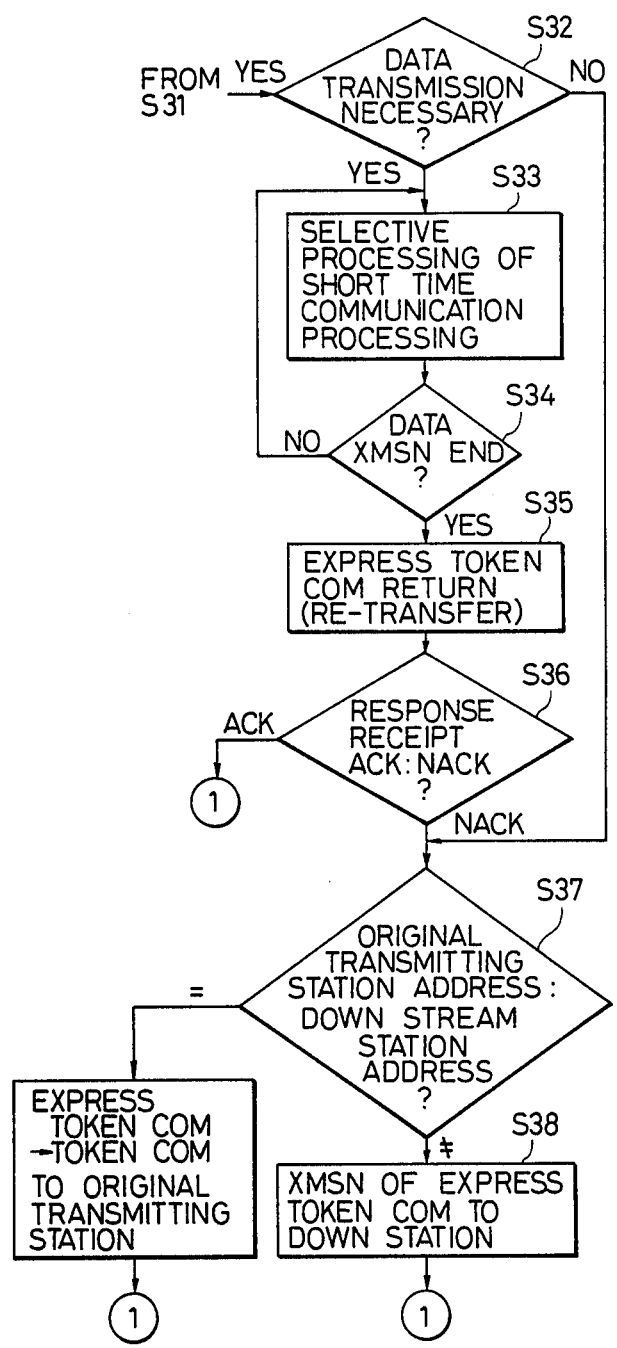

FIGS. 12 and 13 illustrate manners of the propagation of the token command of FIG. 11 on the network of the present system. Like in FIG. 2, a denotes the network transmission line and b-g denotes the communication data transmitting/receiving stations which are of the same construction as that shown in FIG. 9. The arrows show the directions of the propagation of the token command. In the present system, the transmission line is of a unidirectional ring configuration. FIG. 14 shows a flow chart of a control operation for input data to the stations shown in FIGS. 12 and 13. Referring to FIGS. 14 as well as FIGS. 12 and 13, the control operation of the present invention is explained.

FIG. 12 shows the network control operation similar to that of the token passing system. This operation corresponds to an operation in the present embodiment in which multiple operation is not effected, that is, when no communication request is issued by the stations or when the station which received the token command has completed the communication operation and it is to yield the communication right to the next station (steps S21-S24). On the other hand, if the station which has the communication right by the token command needs to start multiple operation (steps S25 and S26), the manner of circulation of the token command is changed as shown in FIG. 13.

It is assumed that the station d in FIG. 13 needs the multiple operation and includes a waiting processing by a mechanical operation or other reason during one communication operation. After the station d gets the communication right (step S21), it starts the communication operation (step S22) and proceeds to the waiting processing (step S25). Then, the station d temporarily sends the token command to the next station e (step S26) and gives up the communication right. This token command data has a flag bit in the control data field 44 or the command code in the control data field 44 which is changed to indicate the temporarily communication right yielding. Such a temporarily communication yield command is hereinafter referred to as an express token command to distinguish it from the ordinary token command.

The station e which received the express token and to which the communication right was temporarily yielded (step S31), is now allowed to send a signal for processing data communication requests stored in its own station. The station e selectively processes only those data communication requests which can be processed in a relatively short time to prevent long time occupation of the network (steps S32 and S33).

At the end of the short time communication (step S34), the station e sends back the express token command to the station d which originally sent the express token command to try to return the communication right (step S35).

If the waiting processing has been completed in the station d (step S38), the communication right yield command is accepted by the station d, which sends back an ACK signal to the station e (step S30) so that the communication right is returned to the station d (step S36). If the station d is still in the waiting process, the station d rejects the communication right yield command and sends back a NACK signal to the station e (steps S28 and S29). Thus, the station e determines that the communication right was not returned to the station d (step S36), and since the waiting processing is still continued in the station d, the station e sends the express token command to the next downstrem station f in order to effectively use this period for the communication between the stations (step S38). It should be noted here that the transmitting station address in the express token command sent to the station f is not the address of the station e but the address of the station d which originally sent the express token command and which is a node of the multiple operation. Thus, the station f sees as if the express token command had been sent directly from the station d.

Like the station e, the station f carries out short time communication processing (steps S21, S31-S34), then tries to return the communication right to the station d which originally sent the express token command (step S35), and if the station d sends back an ACK signal, the station f returns to the initial state, and if the station d sends back a NACK signal, the station f sends the express token command to the next downstream station g (steps S36-S38). The transmitting station address in the express token command sent to the station g is the address of the station d which is the original multiple operation node, as is the case of the above communication. Thus, so long as the express token command sent to the station d is rejected by a NACK signal, the express token command is sent to the sequentially downstream station so that the waiting time in the station d is effectively used for the communication processing in other station.

If the waiting time in the station d is so long that the express token command originally sent by the station d was circulated through the network and reached the station c which is an immediately upstream station to the station d and the communication processing in the station c has been completed, the station c has to yield the communication right to any one of the stations. Otherwise, the communication in the network would be disconnected. Accordingly, the station c must yield the communication right to the station d.

To this end, another decision process is imparted to each of the stations. When the station which received the express token command has completed the required communication processing, it compares the original multiple operation node station address with the downstream station address (step S37) before it sends the express token command to the downstream station (step S38), and if those addresses are not equal, it sends the express token command in the manner described above (step S38), but if those addresses are equal, it changes the express token command to the token command and sends it to the original multiple operation station (step S39).

Since each of the stations is controlled to accept the token command even if it is in the multiple operation (step S21), the token command sent by the station c is accepted by the station d. If the waiting processing has been completed in the station d, it resumes the data communication (step S22), but if the waiting processing has not been completed yet, it sends the express token command to the station e (step S26) to repeat the above operation. When the station d has completed the communication processing (step S23), it sends the token command to the station e (step S24) and the ordinary communication right yielding state as shown in FIG. 12 is established.

In the embodiment shown in FIGS. 12 and 13, the ring network transmission line is used. However, the teaching of the present embodiment is applicable independently from the shape of the network transmission line so long as the communication right yield command is logically evenly circulated through the stations in the network.

In the present embodiment, the station c sends the token command to the station d. If the configuration is such that all of the stations store the upstream and downstream relations among the stations in the network, the station c may send the express token command to the station d, and if it receives the NACK signal, it may send the express token command directly to the station e jumping over the station d.

As described above, in the local area network of the token passing system, if the station has waiting time during the communication processing, the waiting time is utilized for the communication processing in other stations. Thus, the communication efficiency of the network is improved.

Further, because of its simplicity of construction, the present system can be readily and inexpensively attained by merely modifying the communication control firmware of the respective stations.

In the local area network, information from various office equipment such as image readers and word processors are collected by the communication stations, which transmit the data over the network transmission line or the data received by the communication stations are supplied to the office equipment. Since the communication on the network is executed in accordance with a predetermined protocol, communication data of a predetermined format are usually used such as in the HDLC procedure. In addition, since the communication data are modulated and demodulated, the transfer rate on the network transmission line is also predetermined.

If the information sent from the office equipment to the communication stations do not comply with such format and transfer rate, means for converting the data and the transfer rate must be provided in the communication stations.

Such a conversion is inherently necessary because the transmitting office equipment and the receiving office equipment inherently have different data formats and different transfer rates, and it offers an advantage of coupling of different types of office equipment.

However, when the transmitting office equipment and the receiving office equipment have the same data format and the same data transfer rate, that is, when they can communicate with each other by direct connection without the local area network, the conversion in each station functions merely to match the data from the office equipment to the network and the advantage thereby is very small.

Various types of office equipment are presently available to meet the requirements of various office work, various input/output configurations and man-machine interfaces. Accordingly, the above situation very frequently occurs in the local area network which links those office equipment.

A situation which will occur if raw data from the office equipment such as a binary signal sequence representing a density of an image, which does not comply with the data format of the network, is directly sent out to the network transmission line is now explained. Usually, the local area network uses a single transmission line for the purpose of cost reduction and no auxiliary signal line for imparting meaning to the data carried over the transmission line is used, but a communication protocol is used for that purpose.

The communication protocol is an implied understanding among the stations in the network. Each station interprets the transmission/reception operation and the data in accordance with the communication protocol and the data which is a mere sequence of bits carried over the transmission line is imparted with the meaning in accordance with the communication protocol.

The protocol prescribes a data format on the network, a format of a network controlling communication data and a sequence thereof. If raw data from the office equipment which deviates from the standard of the network is directly sent to the network transmission line, the stations in the network will misinterpret it so that the predetermined controlled operation in the network which has so far been maintained by the protocol will be disturbed and the network may malfunction.

Accordingly, the above conversion operation has been necessary in the past. However, the office equipment linked by the local area network are less expensive than computer input/output equipment and it is desirble to keep the local area network of a simple function and low high cost. Accordingly, a cost for the conversion of the data format and the transfer rate is a big drawback.

In the light of the above, a data transmission system is provided which enables direct data communication without the conversion operation in the station so long as at least the office equipment which communicate with each other through the network, has the same data format and the same transfer rate even if the office equipment connected to the communication stations on the local area network have different data formats and different transfer rates and they are different from those prescribed by the communication protocol in the network.

To this end, the communication data for controlling the network and the communication data transmitted to and received from the office equipment are separated, and the former is processed in the standard format of the network and in accordance with the predetermined communication protocol while the latter is processed in any data format and at any transfer rate (hereinafter referred to as non-standard data). While non-standard data is carried over the communication transmission line, all of the stations except the transmitting and receiving stations are inhibited for the communication protocol function in order to avoid the affect thereby.

Figures 15, 16:
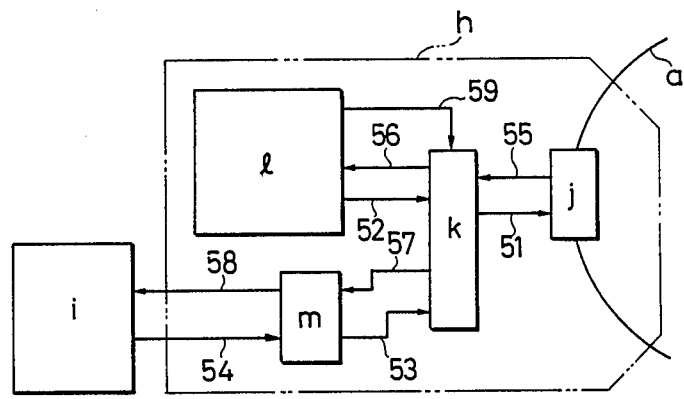
FIG. 15 shows a block diagram of transmitting-/receiving stations connected to a network and office equipment belonging thereto.
FIG. 16 shows a communication control command format in the present invention.

FIG. 15 shows an embodiment of a station having such a function, in which a denotes a local area network communication transmission line, h denotes a transmitting/receiving station and i denotes office equipment (hereinafter referred to as a device) connected to the station h.

The station h is constructed as shown in FIG. 15, in which j denotes a driver/receiver, k denotes a selector, l denotes a controller which contains a communication control processor and which is a primary portion of the network control operated by firmware, and m denotes an adapter for matching the station with an interface of the device i. Numerals 51, 52, 53 and 54 denote transmitting signal lines to the network a and numerals 55, 56, 57 and 58 denote receiving signal lines from the network a. Numeral 59 denotes a control signal line for selecting a signal line of the selector e, which control signal is issued from the controller l.

As seen from FIG. 15, there are two signal routes in the station h, that is, a route for the controller l and a route for the device i. The selector k selects one of the two routes to connect it to the network transmission line a. It is assumed that a selection right is possessed by the controller l, that is, the communication control firmware.

The selector k also has a function to shut out any signal from or to the network transmission line a.

In the present embodiment, a special communication control command called a direct data transfer (DDT) command is used.

The data format of the DDT command may be that shown in FIG. 16 in accordance with the HDLC format. It includes a timer count data for indicating a communication time as auxiliary information, in addition to a command code for identifying the present command.

This communication control command provides commands for the following operations to the stations on the network:

(1) It informs to the transmitting and receiving stations that non-standard data is transferred following the command.

(2) It inhibits all of the stations except the transmitting and receiving stations from transmitting and receiving any data to and from the network transmission line a for a period specified by the timer count in the command data after the reception of the command.

By using the hardware construction shown in FIG. 15 and the DDT command, data generated by the device i is transmitted as is through the network directly between two stations to which the devices of the same data format and the same transfer rate are connected.

Figure 17:
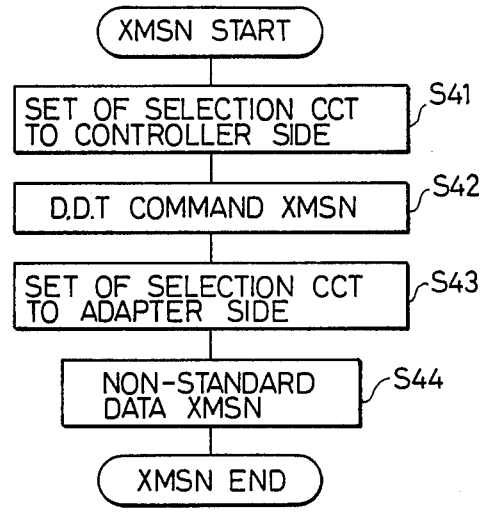
FIGS. 17 and 18 show flow charts of communication operations of a station on a network in the present invention.

FIG. 17 shows a flow chart of a communication control program stored in a ROM of a microcomputer of the transmitting station.

In a step S41, the selector k of the transmitting station connects the network transmission line a to the controller l until the station gets the communication right and is allowed to transmit.

In a step S42, the transmitting station sends the DDT command to all other stations in the network to declare that the non-standard data is to be thereafter sent over the network transmission line a.

In a step S43, the selector k selects the adapter to connect the network transmission line a to the device i, and in a step S44, raw non-standard data such as image information from the device i is sent out to the network transmission line a.

Figure 18:
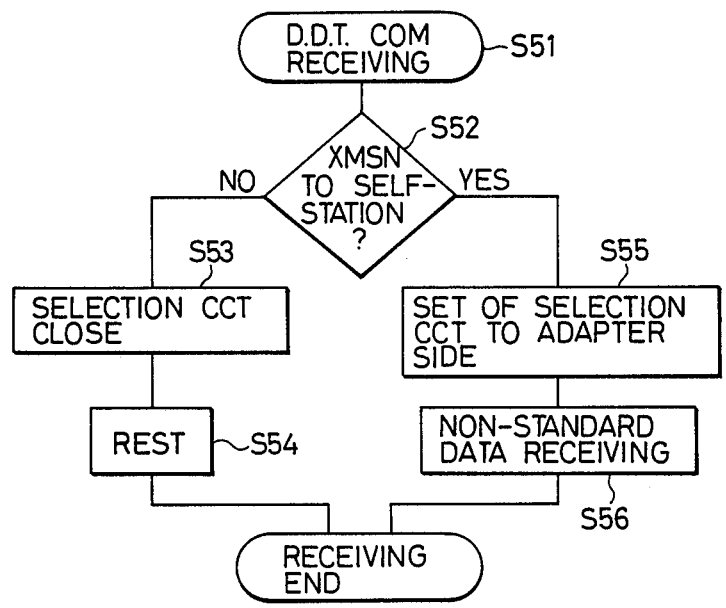

FIG. 18 shows a flow chart of the operation in all of the stations on the network except the transmitting station. When the DDT command is received in a step S51, the station determines in a step S52 if the transmission is to its own station or not by checking the receiving station address in the command code shown in FIG. 16.

If it is not a transmission to its own station, the station proceeds to a step S53 to read out the timer count data in the DDT command data, and in a step S54, the selector k shuts out any signal from or to the network transmission line a during that period. Thus, any operation in accordance with the communication protocol is inhibited in this station during that period.

If the DDT command is to its own station as determined in the step S52, the station goes to a step S55 where the selector e connects the transmission line a to the adapter to connect the device c to the network transmission line a.

In a step S56, the station sends the nonstandard data sent from the transmitting station device c to the device c connected to its own station. Then, the receiving operation is terminated.

As described above, the selector for selecting the route for the data for controlling the communication and the route for the device data is provided in each station and the communication control command includes the timer count. In the stations other than the transmitting and receiving stations, any communication processing is inhibited until the time period specified by the timer count has elapsed. In this manner, the data from the device which does not comply with the standard format and the transfer rate of the network can be directly transmitted through the network.

Since the outputs from the stations other than the transmitting and receiving stations are inhibited, when a large volume of continuous data such as image information is transmitted, waste time due to retransmission of such a large volume of data because of conflict of information during the transmission is avoided.

Figure 19:
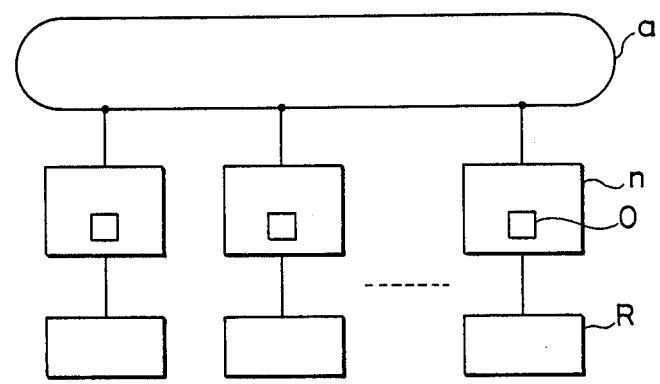
FIG. 19 shows a block diagram of a prior art network configuration.

As described above, the local area network was derived from a computer network but a configuration thereof is significantly simplified and different from that of the computer network for the purpose of cost reduction. FIG. 19 shows an example of a conventional local area network in which a denotes a ring network transmission line, n denotes a communication control unit called a node, o denotes an address switch which serves as a code switch for setting an address of the associated node, and R denotes a device which is one of various types of office equipments. Each device R is connected to the network transmission line a through the corresponding node n and the pair of node n and device R forms a station. The nodes n have different addresses from each other. Each node n receives only the communication data having the same address as that of its own. Thus, an operator at the transmitting station specifies the address of the receiving node to transmit the data. In this manner, one-to-one data communication is effected between two distant devices R through the network transmission line a.

The local area network usually communicates data through a single transmission line a and each node n is provided with a small scale processor such as a microcomputer for decision making operations. Accordingly, in many cases, no central processor (host) for managing the entire system is provided. On the other hand, the computer network usually communicates data through a plurality of transmission lines (multiple bus) and has a central processor or a host having a sufficient data processing ability to manage the entire system. Accordingly, it can be said that a local area network lacks the significant data processing ability of a computer network and extracts only the communication ability of a computer network and the communication ability is further simplified as much as possible to reduce the cost. Since the redundancy of the system of the local area network is significantly reduced, it has little ability to withstand a failure.

For example, when communication is to be started in the local area network shown in FIG. 19 and a destination station is inoperable by a failure or other reason, there is no means to countermeasure it. Thus, the transmission is given up if the communication is of non-urgent nature, and for the communication of urgent nature, an indication of the down state of the receiving station is provided to an operator at the receiving station through a separate communication line such as a telephone line to request that he urgently repair the receiving station. Atternatively an operator at the transmitting station checks if an alternative station is provided in the receiving station, and if it is, the operator sets the address and retransmits the data. Thus, as the scale of the local area network becomes larger, the numbers of the nodes and the devices increase and the number of instances requiring the intervention by the operators also increases. On the other hand, the computer network, while it is expensive, has a duplex of units forming the network and the central processor diagnoses and detects the failure to automatically isolate the failure unit and changes the addresses to reconfigure the system by the normal unit. In this manner, the failure is isolated without the intervention of the operator.

However, since the local area network is usually used in a small scale intercompany communication or intergroup communication and it is required to be an inexpensive and simple communication system, it is not desirable to increase the cost by providing the failure avoidance means similar to that used in the computer network and providing duplicate units merely for the purpose of improving the reliability is avoided. In the computer network, the system configuration is often uniquely determined at the time of installation and the failure avoidance processing can be carried out based on the system configuration information determined at the time of the system design. On the other hand, in the local area network, the system configuration is often changed by simply attaching and detaching the nodes n and the devices R to and from the network transmission line A. Accordingly, it is not suitable to effect the failure avoidance processing based on known system configuration information.

Further, as described above, the communication right on the network is obtained under a predetermined rule and it is not always obtained when the transmission is requested. For example, if a station which has the communication right gives up the transmission because the destination station is not in a receiving state, the transmitting station may not readily get the communication right again to transmit the same information. If a large volume of continuous data such as text image information is to be transmitted and the transmitting station has no memory function such as an image memory, the operator must set the station for reading the text several times and the burden on the operator increases.

In the light of the above, a local area network is provided in which each node has a first address switch having a communication address of its own station set therein and a second address switch having a communication address of an alternative station located relatively closely to its own station set therein, and when the failure occurs, the data is transmitted to the station having the second address switch which contains the transmitting address so that the failure is automatically avoided by a relatively simple construction.

Figure 20:
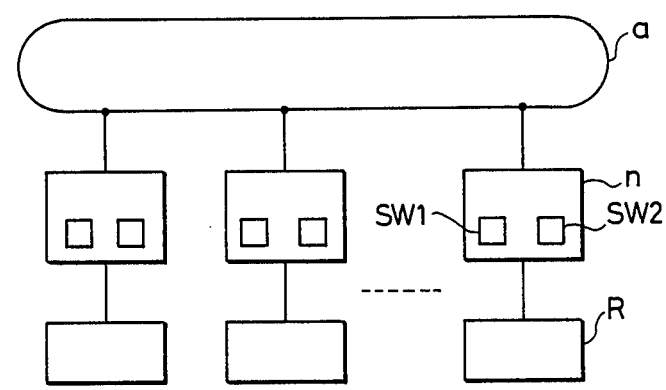
FIG. 20 shows a block diagram of a local area network of the present invention.

FIG. 20 shows a configuration of the local area network having such a function, in which SW1 denotes a first address switch having a communication address of its own station (hereinafter referred to as an inherent address) set therein, and SW2 denotes a second address switch having a communication address of an alternative station located relatively closely to its own station (hereinafter referred to as an alternative address). The other construction is similar to that of FIG. 19 and hence details thereof are not explained here.

It frequently occurs that a plurality of the same type of receiving stations in the same office are connected to the local area network and a plurality of offices having the same type of receiving stations are located close to each other. In such a case, the purpose of the data transmission will be attained if one receiving station is down, the data is transmitted to the receiving station which is closest to the down station. The present embodiment is suitable for use in such a situation.

Figure 21:
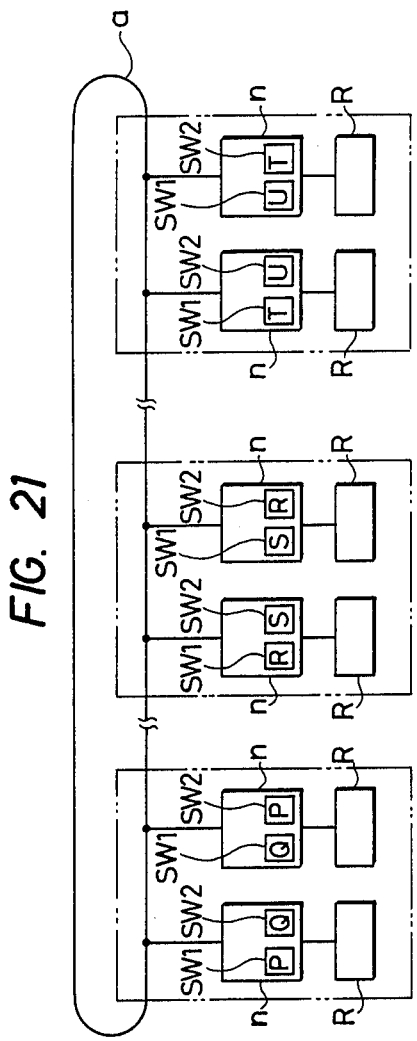
FIGS. 21 and 22 show block diagrams of address sets of the network of FIG. 20, FIGS. 23 and 24 show flow charts of control operations of a communication processing unit of the network of FIG. 20.

FIG. 21 illustrates settings of the inherent address and the alternative address to the first and second address switches SW1 and SW2 of the local area network of FIG. 20. Each pair of the stations enclosed by broken lines are located close to each other and in an alternative relation to each other. The term alternative means that one station can receive the data in place of the other station. The alternative address in one station is set to the inherent address in the other station. For example, if the inherent addresses of the first address switches SW1 are P and Q, the alternative addresses of the second address switches SW2 are Q and P, respectively. In a normal condition, the data is transmitted and received in accordance with the inherent address. If the receiving station is down due to a failure or other reason, the transmitting station detects it and the data is transmitted and received in accordance with the alternative address. For example, when the first station has the first address switch SW1 having the inherent address P set therein and the second address switch SW2 having the alternative address Q set therein and the second station having the inherent address Q which is equal to the alternative address of the first station is down, the first station which has the inherent address P and the alternative address Q receives the data in place of the second station. Conversely, if the first station having the inherent address P is down, the second station having the inherent address Q and the alternative address P receives the data. The stations which are in the mutual alternative relation are hereinafter referred to as alternative stations.

Figure 22:
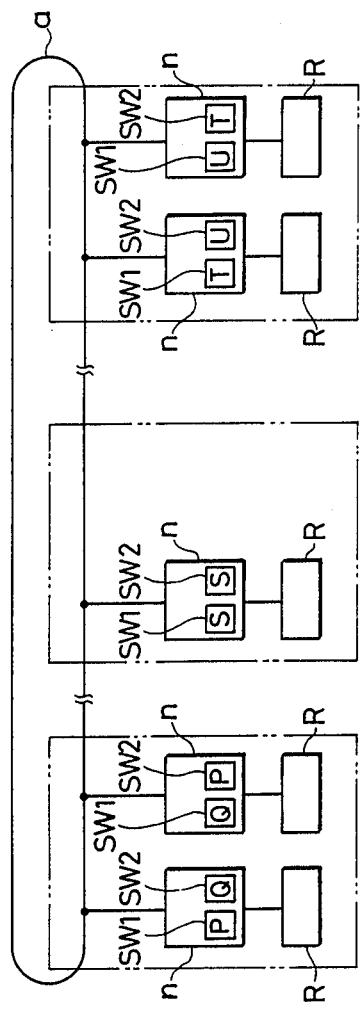

FIG. 22 shows an embodiment in which the alternative stations cannot be constructed in the local area network of FIG. 20. A station having a first address switch SW1 set to an inherent address S is located distantly from other stations and no alternative location is available. In this case, the second address switch SW2 is set to S which is same as the inherent address. When the alternative station for the station of the inherent address is not available in the network and the station of the inherent address is down, the transmission is terminated.

Figure 23:
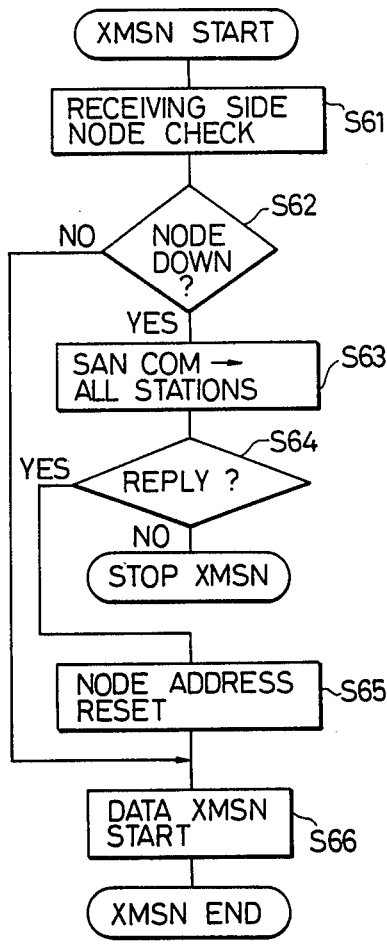
Figure 24:
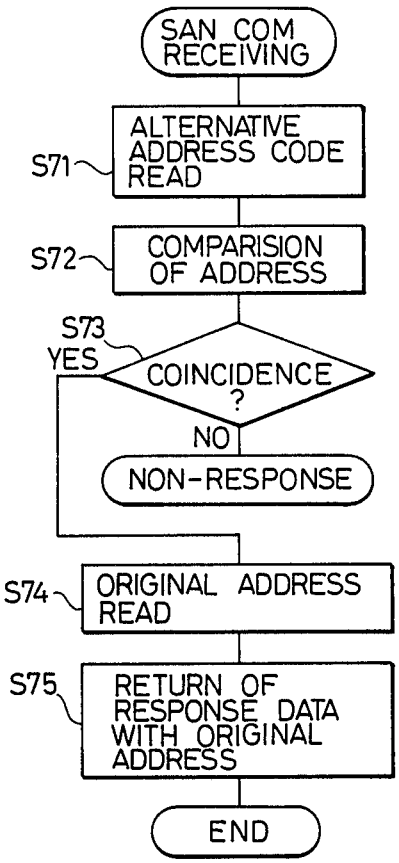

The control operation of the local area network of FIGS. 20–22 is now explained with reference to flow charts shown in FIGS. 23 and 24. The process corresponding to the steps shown in the flow charts are stored in a ROM of a microcomputer in each station, which controls the communication.

Prior to the start of transmission of data, a response status of the receiving node n is checked (step S61) to determine if it is down (step S62). If it is not down, the process jumps to a step S66 to start the transmission of the data. If it is determined that the receiving node n is down, the transmitting station sends a SAN (search alternative node) command to all other stations in the network (station S63). The SAN command contains the inherent address code of the down receiving station in order to search the alternative station which works in place of the down receiving station. Since the transmission line a of the local area network usually has a broadcasting function through the unidirectional ring bus, it is relatively easy to send the SAN command to all of the stations.

When the node n receives the SAN command, it reads out its own alternative address code from the second address switch SW2 (step S71), and compares the alternative address code with the inherent address code of the down receiving station contained in the SAN command (step S72). If they are not equal, it cannot replace and does not send a response, but if they are equal (step S73), it reads out the inherent address code from the first address switch of its own (step S74) and sends the inherent address code together with a predetermined response data to the transmitting station through the transmission line a (step S75).

If the transmitting station does not receive a response to the SAN command, it determines that the alternative station is not available like the station S shown in FIG. 22 and terminates the transmission. If it receives the response to the SAN command (step S64), it sets the inherent address of the alternative station contained in the response data as the receiving node address (step S65) and starts the data transmission to the alternative address (step S66).

The first address switch SW1 and the second address switch SW2 may be provided in each of the stations, and they need not be provided in the node n as shown but they may be provided in the device R or in an integrated unit of the node and the device. An additional alternative address switch may be provided so that each station can be a replacement for a plurality of other stations. The address switch may be any means which can apply a specific code data to a firmware (microprogram) of a processor (node) of the communication control unit.

As described hereinabove, the alternative switches (second address switches) having the addresses of the stations to be replaced set therein are provided and the system is automatically recovered from the down state by the alternative switches. Accordingly, the local area network which eliminates the intervention of the operator without substantial increase of the cost and with the simple construction is provided.

Since the present system does not require the central station, the system is inexpensive and has high flexibility for system expansion. Since it does not depend on known network configuration information and starts to search the alternative station when the failure occurs, it is suitable for use in the local area network in which the system configuration is frequently changed.

Further, since the data transmission is terminated when the transmitting station requests the data transmission, the burden on the operator at the transmitting station is relieved.

As described hereinabove, each station in the local area network is equipped with the small processor for controlling the communication in accordance with the predetermined protocol and controls the communication by the firmware. Except in the case of a very sophisticated system, the ordinary inexpensive local area network has very small transmitting/receiving stations, the communication controlling processors in the stations are microcomputers, and the firmware memories thereof are ROM's (read-only memories). One of the reasons for using the ROM rather than a RAM (writable/readable memory) as the firmware memory is that many inexpensive ROM's suitable for the microcomputer are available, but the biggest reason therefor is the low cost of the ROM. If a storage device such as a floppy disc device or a cassette magnetic tape device for loading the firmware in the RAM is required as is done in a conventional computer communication system, it is a big burden to the local area network which aims at a low cost because it increases the price of the system.

However, although the local area network aims for low cost, it assumes the form of the communication system and hence the expandability and the flexibility of the system are necessarily required. Accordingly, it is, of course, desirable to construct the system to allow the loading of the firmware which manages most portions of the function in order to prepare for the expansion and the modification of the system function, as is done in many firmware controlled computer systems.

In the light of the above, a network system which is suitable to an inexpensive local area network is described below.

Figure 25:
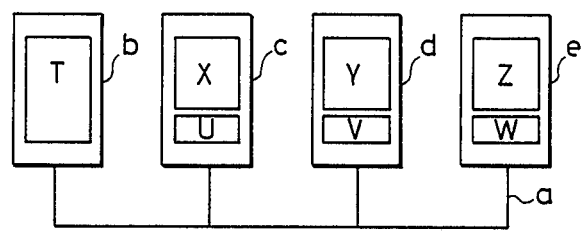
FIG. 25 shows a block diagram of a configuration of a local area network in accordance with the present invention.

FIG. 25 shows a configuration of a local area network, in which a denotes a network transmission line, b, c, d and e denote transmitting/receiving stations connected through the transmission line a, and T, U, V, W, X, Y and Z denote memories for storing communication controlling firmwares for the respective stations b–e. The memories T, U, V, and W are ROM's (read-only memories) which store predetermined firmware data are fixed by baking. The remaining memories X, Y and Z are RAM's (writable/readable memories) which do not contain the firmware at the initial start-up of the network system.

The station b controls the firmware loading operations in the other stations c–e and it is called a booting master station. The remaining stations c, d and e have their firmware loaded by the booting master station b and they are called slave stations. The ROM T in the booting master station b contains firmware code data which are sufficient to carry out all communication functions but the ROM's U, V and W in the slave stations c, d and e contain only the firmware which are necessary to carry out the minimum communication function at the initial start-up of the system.

The control operation of FIG. 25 is now explained with reference to a flow chart shown in FIG. 26. This flow chart is a portion of the minimum required firmware and is stored in the ROM in each station.

At the start of the network, the firmware of the slave stations c, d and e operate only on the respective ROM's U–W and the stations wait for the receipt (steps S81 and S82). The booting master station b then starts the following transmission operation by the firmware operated on the ROM T. The firmware code data (firmware data) at those memory addresses which correspond to the firmware portion not contained in the ROM's U–W of the slave stations c–e is read from the ROM T of the booting master station b and the read firmware data is transmitted to the slave stations c–e as the communication data from the station b through the transmission line a (steps S83–S86). All of the firmware data may be transmitted in one transmission operation but if the firmware data is of relatively large volume, it may be divided into a certain number of blocks so that the data is transferred in several times of transmission operation.

The firmware data transmitted from the station b is received by the slave stations c–e and stored in the corresponding address areas of the respective RAM's X–Z under the control of the firmware on the respective ROM's U–W (steps S87 and S88). In a local area network having a plurality of slave stations and only one-to-one communication means among the stations, it is necessary to transmit the firmware data from the booting master station to each of the slave stations one at a time, but in a network having a broadcasting function, it is possible to simultaneously read the firmware data sent out to the transmission line into the respective slave stations in order to reduce the number of times of the transmission. In this manner, the loading of the firmware in the slave stations c–e is completed and the communication operation of the network is started in all of the stations b–e (steps S89 and S90).

When the network system is expanded or modified, the ROM of the booting master station b is replaced with a ROM which contains the firmware for the expanded or modified system and the above steps are carried out. In this manner, the new firmware can be readily loaded.

For the purpose of simplifying the explanation, the network comprising the stations of the same type and the same function is shown in the present embodiment. However, the teaching of the present embodiment is equally applicable to a local area network system which comprises stations having different firmware and different functions. For example, the booting master stations b are provided one for each group of the same type of stations and the firmware are loaded to the same type of slave stations by the booting master station in the same manner as that described above.

As described hereinabove, since the firmware stored in the ROM of the booting master station is transferred to the RAM's of the respective slave stations through the transmission means, the firmware can be loaded in a very inexpensive manner without using an expensive storage device such as a floppy disc device.

Further, since the very inexpensive ROM is presently available because of the advancement of the semiconductor technology, the cost for changing the firmware by exchanging the ROM is not comparative to the cost for exchanging the record medium such as a floppy disc. In addition, since the firmware in the plurality of stations can be changed by changing the ROM in one station, the expansion or the modification of the system function can be attained at a relatively low cost.

The local area network means a narrow area network as represented by the term and it usually connects interoffice equipment or equipment in closely located offices. However, there is a trend to link the individually constructed small scale local area networks to develop a large scale network.

A station called a gateway plays an important role to link those local area networks.

Figure 27:
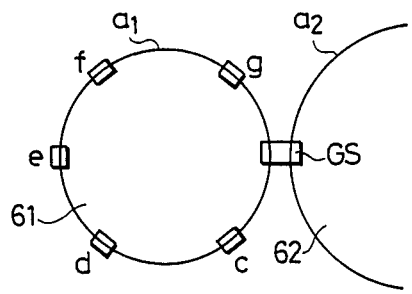
FIG. 27 shows a block diagram of a system configuration of a prior art local area network.

FIG. 27 shows a schematic configuration of a conventional network having a gateway, in which numerals 61 and 62 denote first and second networks, a1 and a2 denote network transmission lines in the networks 61 and 62, GS denotes a gateway station and c-g denote transmitting/receiving stations in the networks.

The gateway station GS functions as a linking path of a plurality of local area networks, but when it is looked in one local area network it is merely one of the transmitting/receiving stations. In general, the local area network is operated in accordance with a certain network control system so that all of the stations in the networks 61 and 62 are operated in accordance with a certain protocol to maintain the network function.

Even the gateway station GS is not exceptional and it is obliged to obey the protocol.

The gateway station GS has the following functions:

(1) It selects one of the transmission requests issued by the stations in the local area networks to which the gateway station belongs which desires to communicate with a station in other local area network across the local area network of its own. In this case, the gateway functions as a virtual receiving station.

(2) For the cross-network transmission request sent from other local area network, it searches a receiving station in the local area network which the gateway station links and communicates therewith. In this case, the gateway station functions as a virtual transmitting station.

Those functions are essentially different from the functions of the other stations c-g. In the past, those functions cannot be attained only by the communication protocol in the local area network, and a new communication control command is added to the communication protocol to start the gateway station and carry out the functions (1) and (2) above in order to attain the communication across the local area networks. Supporting this command is a big burden to the stations other than the gateway station.

In the light of the above, a local area network is provided in which the stations in the local area network can issue the transmission requests to the stations in other local area network in the same manner as that used when the stations issue the transmission requests to the stations in the same local area network, and can receive the transmission request from the stations in the other local area network in the same manner as that used when the stations receive the transmission requests from the stations in the same local area network. As a result, the burden to the stations other than the gateway station is substantially reduced and the processing in the gateway station is greatly simplified.

In general, many data communicated in the local area network include the transmitter addresses and the receiver addresses. In the present embodiment, such a data format is used. By comparing the receiver address with the address of its own station, it is determined whether the communication data transmitted over the network transmission line is to be taken into its own station or not.

Figure 28:
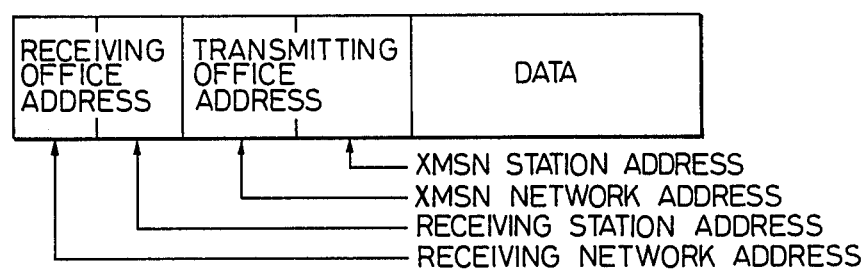
FIG. 28 shows a communication data format in the present invention.

In sending back a response to the received communication data, the transmitter address is used. In the present embodiment, as shown in FIG. 28, the receiver address contains the station address indicating the receiving station as well as a network address indicating the network to which the receiving station belongs.

Since the station addresses are separately set in the different networks, the same station address may exist in those different networks. The network address is used to discriminate them.

When the station in one network wishes to communicate with the station in the other network, the transmitting station sends the receiving network address and the receiving station address together with the communication data.

Similarly, the transmitter address contains the transmitting station address and the transmitting network address. Thus, the receiver address, the transmitter address and the data form the communication data.

In accordance with the above presumption, in the present embodiment, the gateway station GS and the other stations are operated under the following convention.

(1) All of the transmitting/receiving stations other than the gateway station have a predetermined fixed network address of the local area network to which they belong. A non-used network address, for example, address zero is used as the fixed address. In this case, the address zero should not be allocated to the network.

(2) Accordingly, so long as the transmission is directed to the station in the same network, the network addresses in the transmitter and receiver addresses associated with the communication data are zero.

(3) When the transmission is directed to the station in the other local area network, the network address in the receiver address associated with the communication data is one corresponding to the other network but the network address in the transmitter address is zero.

(4) When the station in the local area network receives the communication data, if the network address in the receiver address associated with the communication data is zero, the receiving station compares the receiving station address in the receiver address with the station address of its own, and if they are equal, it receives the communication data, and if they are not equal, it does not receive the communication data.

(5) If the network address in the receiver address associated with to the communication data is not zero, the receiving station determines that the communication data is directed to the station in the other network and it does not receive the communication data.

(6) The gateway station always monitors all of the transmission data issued by the network to which it belongs and disregards the transmission data so long as the network addresses in the receiver addresses of the transmission data are zero because they are communications within the same local area network, but if the network address is not zero, it determines that the transmission request is directed to the station in the other network and receives it and starts the link operation to the local area network of the specified network address. The network address inherent to the other local area network is added to the transmitting station network address in the received communication data.

(7) When the gateway station sends the communication data received from one network to the other network, it changes the receiving station network address in the communication data to zero. Thus, the data sent out from the gateway station has an indication that it is allotted to one of the stations in the same network so that the station in the same network can receive the communication data in accordance with the rule (4).

Figure 29:
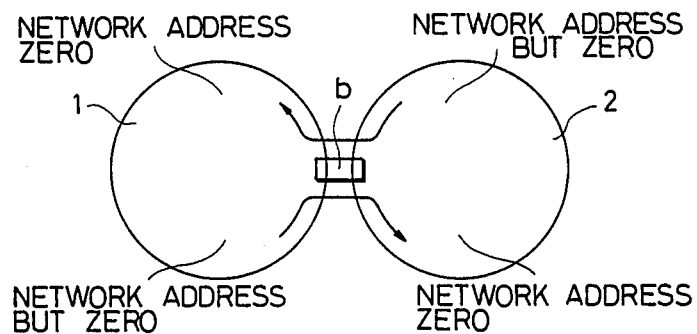
FIG. 29 shows a network used to explain an embodiment of the present invention.

The acceptance of the communication data by the gateway station and changing of the network address are illustrated in FIG. 29.

According to the processing of the present embodiment;

(1) The starting of the gateway station is determined depending on whether or not the receiving station network address in the communication data is zero.

(2) All of the stations other than the gateway station can regard the network addresses of the local area network to which they belong are zero.

(3) The only changing operation required to the gateway station is to change the receiving station network address to zero as shown in FIG. 29.

Figure 30:
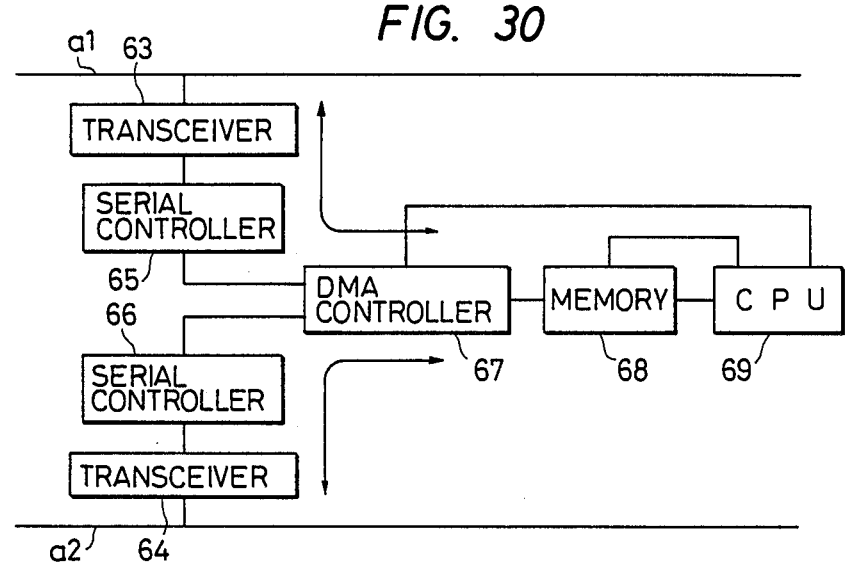
FIG. 30 shows a block diagram of a configuration of a gateway station in the present invention.

FIG. 30 shows a configuration of the gateway station, in which numerals 63 and 64 denote transceivers for transmitting and receiving with the network transmission lines a1 and a2, respectively, and numerals 65 and 66 denote serial controllers which are coupled to the transceivers 63 and 64, respectively, and designed depending on the types of the data transmission on the transmission lines a1 and a2, respectively, and function as interfaces between the transmission lines a1 and a2, respectively, and a DMA controller 67. The communication data as shown in FIG. 28 on the transmission lines a1 and a2 are transferred from the transceivers 63 and 64 to the DMA controller 67 through the serial controllers 65 and 66, respectively, as shown by arrows, and then they are stored in a memory 68. A central processor unit (CPU) 69 analyzes the network address of the received communication data in accordance with a flow chart shown in FIG. 31. A program of the flow chart is stored in a ROM in the CPU 69 of the gateway station GS.

Figure 31:
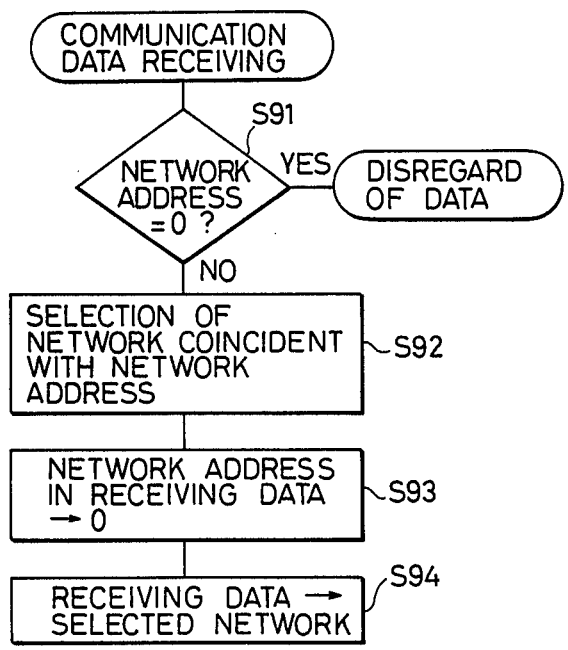
FIG. 31 shows a flow chart of a network address analysis process.

Referring to FIG. 31, after the CPU 69 has confirmed the receipt of the communication data, it checks the network address to determine whether or not it is zero (step S91), and if it is zero, it disregards the data, and if it is not zero, it goes to a step S92 where it selects the network having the same network address as that in the received communication data. In a step S93, it sets the network address in the received communication data to zero, and in a step S94, it sends out the received communication data to the selected network.

As described hereinabove, the starting of the gateway station is controlled by adding the transmitting and receiving station addresses and the transmitting and receiving network addresses to the communication data and determining whether or not the receiving station network address has the specified address. In addition, the stations other than the gateway station can determine whether or not the transmission is directed to the station in the same network by a similar decision operation.

Since it is not necessary to add a new communication control command for the above operations, the operation speed of the gateway station can be increased.

What is claimed is:

1. A data transmission system including a plurality of stations connected to each other through a transmission line, wherein only a station to which a communication right has been assigned is permitted to perform data transmission between that station and another station of the remaining plurality of stations, wherein each of said plurality of stations comprises:

means for retrieving another station of said plurality of stations to which the communication right is to be assigned;

means for assigning the communication right to said other station retrieved by said retrieving means;

means for storing information representative of said other station retrieved by said retrieving means, wherein said assigning means is operable to reassign the communication right to said other station a plurality of times according to information stored in said storing means, without performance of the retrieving operation by said retrieving means, and said retrieving means is operable to perform the retrieving operation every time the assignment of the communication right is carried out a predetermined plural number of times by said assigning means.

2. A system according to claim 1, wherein each of said plurality of stations has an address associated therewith.

3. A system according to claim 2, wherein said retrieving means is operable to transmit a predetermined command which sequentially changes the address of said another station to which the communication right is to be assigned and to perform the retrieving operation by means of discriminating on the basis of the presence or the absence of a response to the command.

4. A system according to claim 3, further comprising obtaining means for obtaining the address of another station to which the communication right is to be assigned by means of sequentially adding a predetermined value to the address of the station to which the communication right has been assigned.

5. A system according to claim 2, wherein said storing means stores the address of said another station retrieved by said retrieving means.

6. A system according to claim 1, wherein said plurality of stations are bus-connected through the transmission line.

7. A system according to claim 1, further comprising counting means for counting the number of the assignment of the communication right carried out by said assigning means.

* * * * *

UNITED STATES PATENT AND TRADEMARK OFFICE
CERTIFICATE OF CORRECTION

PATENT NO. : 4,779,092

DATED : October 18, 1988

INVENTOR(S) : MITSUJI TAKAO

Page 1 of 5

It is certified that error appears in the above-identified patent and that said Letters Patent is hereby corrected as shown below:

SHEET 1

Figure 2, "e:2" should read --b:2--.

SHEET 4

Figure 9, "TRANCEIVER" should read --TRANSCEIVER--
    and "KIND" should read --KINDS--
    (all occurrences).

SHEET 5

Figure 12, "◞a" should read --◞d--.

SHEET 14

Figure 26:
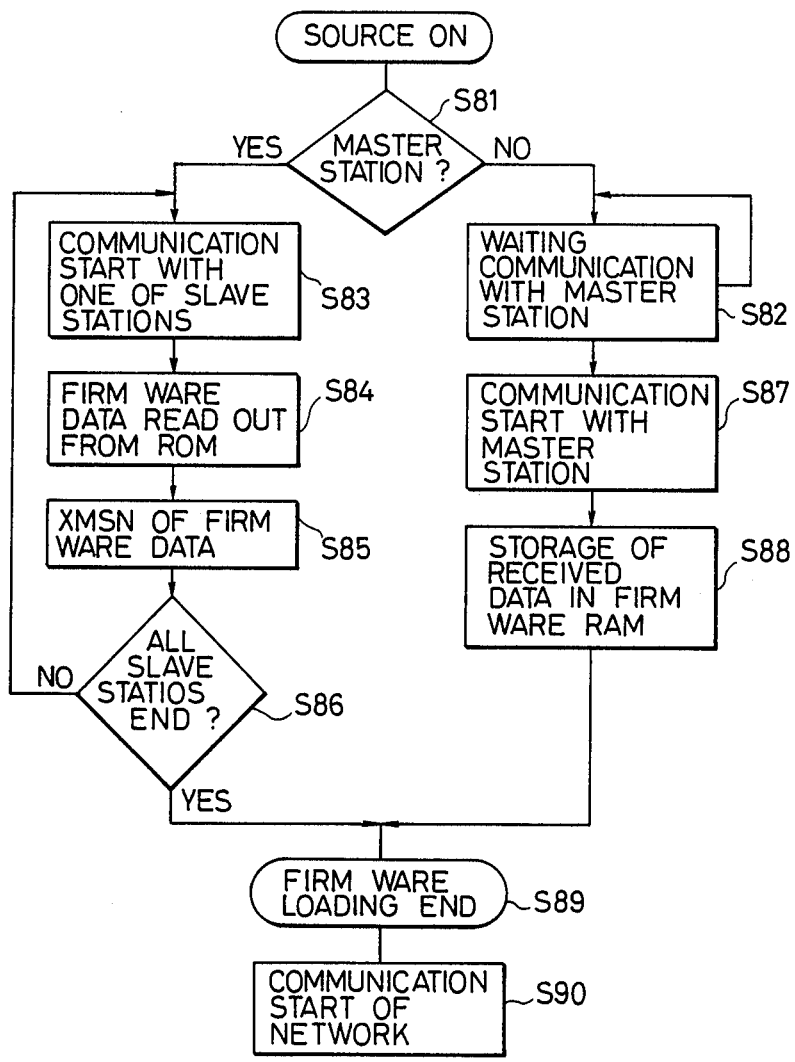
FIG. 26 shows a flow chart of a control operation in FIG. 25.

Figure 26, "STATIOS" should read --STATIONS--.

COLUMN 1

Line 18 "been" should be deleted.

COLUMN 3

Line 14, "been" should be deleted.
    Line 33, "communication" should read --communication--.
    Line 35, "other" should read --another--.
    Line 43, "is proceeded" should read --proceeds--.

UNITED STATES PATENT AND TRADEMARK OFFICE
CERTIFICATE OF CORRECTION

PATENT NO. : 4,779,092
DATED : October 18, 1988
INVENTOR(S) : MITSUJI TAKAO

It is certified that error appears in the above-identified patent and that said Letters Patent is hereby corrected as shown below:

COLUMN 4

Line 7, "Furthermore" should read --Furthermore,--.
    Line 37, "yield" should read --yields--.

COLUMN 6

Line 17, "a" should read --the-- and
        "the" should read --a--.
    Line 30, "member" should read --number--.

COLUMN 7

Line 23, "of system" should read --of the system--.
    Line 49, "pauses" should read --stops--.
    Line 67, "a" (second occurrence) should read --an--.

COLUMN 8

Line 9, "a" (first occurrence) should read --an--
        and "a" (second occurrence) should read
        --the--.
    Line 13, "other" should read --another--.
    Line 34, "denotes" should read --denote--.
    Line 68, "temporarily" should read --temporary--.

COLUMN 9

Line 1, "temporarily" should read --temporary--.
    Line 30, "downstrem" should read --downstream--.
    Line 37, "sees" should read --receives--.
    Line 58, "other" should read --another--.

UNITED STATES PATENT AND TRADEMARK OFFICE
CERTIFICATE OF CORRECTION

PATENT NO. : 4,779,092
DATED : October 18, 1988
INVENTOR(S) : MITSUJI TAKAO

It is certified that error appears in the above-identified patent and that said Letters Patent is hereby corrected as shown below:

COLUMN 11

Line 34, "interpretes" should read --interprets--.
    Line 52, "desirble" should read --desirable--.
    Line 54, "high" should be deleted and
          "a cost" should read --a high cost--.

COLUMN 12

Line 10, "the affect" should read --being affected--.

COLUMN 13

Line 47, "waste" should read --wasted--.
    Line 60, "equipments." should read --equipment.--.

COLUMN 14

Line 5, "small scale" should read --small-scale--.
    Line 6, "decision making" should read
          --decision-making--.
    Line 31, "Atternatively" should read --Alternatively,--.
    Line 46, "small scale" should read --small-scale--.
    Line 61, "line A." should read --line a.--.

COLUMN 15

Line 33, "if" should read --if, when--.

UNITED STATES PATENT AND TRADEMARK OFFICE
CERTIFICATE OF CORRECTION

PATENT NO. : 4,779,092
DATED : October 18, 1988
INVENTOR(S) : MITSUJI TAKAO

It is certified that error appears in the above-identified patent and that said Letters Patent is hereby corrected as shown below:

COLUMN 16

Line 14, "are" should read --is--.
    Line 24, "(station S63)." should read --(step 63).--

COLUMN 18

Line 55, "to" should read --in--.

COLUMN 19

Line 9, "small scale" should read --small-scale--.
    Line 10, "large scale" should read --large-scale--.
    Line 20, "looked" should be --linked--.

COLUMN 20

Line 52, "to" should be deleted.

COLUMN 21

Line 19, "are" should be --as--.

UNITED STATES PATENT AND TRADEMARK OFFICE
CERTIFICATE OF CORRECTION

PATENT NO. : 4,779,092

DATED : October 18, 1988

INVENTOR(S) : MITSUJI TAKAO

It is certified that error appears in the above-identified patent and that said Letters Patent is hereby corrected as shown below:

COLUMN 22

Line 19, "means;" should read --means; and--.

Signed and Sealed this

Twentieth Day of March, 1990

Attest:

JEFFREY M. SAMUELS

*Attesting Officer*    *Acting Commissioner of Patents and Trademarks*